(12) United States Patent
Chaiken et al.

(10) Patent No.: US 6,587,966 B1
(45) Date of Patent: Jul. 1, 2003

(54) OPERATING SYSTEM HANG DETECTION AND CORRECTION

(75) Inventors: Craig L. Chaiken, Tomball, TX (US); Stan Stanart, Spring, TX (US)

(73) Assignee: Hewlett-Packard Development Company, L.P., Palo Alto, CA (US)

( * ) Notice: Subject to any disclaimer, the term of this patent is extended or adjusted under 35 U.S.C. 154(b) by 0 days.

(21) Appl. No.: 09/557,700

(22) Filed: Apr. 25, 2000

(51) Int. Cl.[7] .............................................. G06F 11/00

(52) U.S. Cl. ............................ 714/34; 714/23; 714/55; 713/2

(58) Field of Search ............................ 714/34, 51, 55, 714/23; 707/202; 713/2

(56) References Cited

U.S. PATENT DOCUMENTS

| | | | | |
|---|---|---|---|---|
| 5,245,615 A | * | 9/1993 | Treu ............................... | 714/45 |
| 5,390,324 A | | 2/1995 | Burckhartt et al. .......... | 395/575 |
| 5,513,319 A | * | 4/1996 | Finch et al. .................... | 714/55 |
| 5,594,865 A | * | 1/1997 | Saitoh ........................... | 714/55 |
| 5,655,083 A | * | 8/1997 | Bagley ........................... | 714/23 |
| 5,944,840 A | * | 8/1999 | Lever ............................ | 714/34 |
| 6,012,154 A | * | 1/2000 | Poisner .......................... | 714/55 |
| 6,061,810 A | * | 5/2000 | Potter ........................... | 714/23 |
| 6,253,320 B1 | * | 6/2001 | Sekiguchi et al. .............. | 713/2 |

OTHER PUBLICATIONS

Advanced Configuration and Power Interface Specification, Intel, Microsoft, Toshiba, Revision 1.0b, Feb. 2, 1999, pp. 1–2, 52, and 57–58.
Roxio™ Webpage on GoBack Features, http://www.roxio.com/en/products/goback/gbretfeatures.htm 1, pp. 1–2.

* cited by examiner

*Primary Examiner*—Robert Beausoliel
*Assistant Examiner*—Christopher McCarthy
(74) *Attorney, Agent, or Firm*—Akin Gump Strauss Hauer & Feld LLP (57) ABSTRACT

An operating system hang condition is detected by exploiting the fact that when an operating system hang condition occurs, the operating system kernel generally fails to respond to operating system interrupts. Consequently, an operating system hang condition may be detected by setting a status flag to a first value, generating an operating system interrupt intended for an operating system interrupt handler within an operating system kernel that resets the status flag to a second value, executing the operating system interrupt handler if the operating system kernel is responding to the operating system interrupt and executing a system BIOS interrupt handler that measures a time interval in which the status flag is set to the first value without being reset to the second value. If the measured time interval exceeds a threshold time interval, an operating system hang condition may be presumed to have occurred and an appropriate procedure may be initiated that informs the user of an operating system malfunction, performs a system reset operation or corrects the problem causing the operating system hang condition.

25 Claims, 4 Drawing Sheets

OPERATING SYSTEM HANG DETECTION AND CORRECTION

BACKGROUND OF THE INVENTION

1. Technical Field of the Invention

The present invention relates in general to the field of computer systems, and in particular, by way of example but not limitation, to operating system hang detection and correction within a computer system.

2. Description of Related Art

Despite advances in computer and operating system architectures, computer systems continue to be vulnerable to operating system hang conditions from time to time. The primary cause of this vulnerability is that operating system hang conditions may occur for a wide variety of reasons that are difficult to predict and even more difficult to completely avoid. For example, an operating system hang condition may occur due to insufficient system resources, incompatible use of the available resources, incompatible device drivers or errors in the operating system or application software. Furthermore, the particular configuration of the system may produce an operational state that the operating system was not originally designed to handle, or may continuously generate an event, such as a hardware or software interrupt, that the operating system cannot clear using available methods. As a result, the operating system may enter a continuous loop or an unknown operational state from which the operating system cannot recover without some form of intervention, such as a system reset.

The problems associated with operating system hang conditions are exacerbated by the fact that the user typically cannot distinguish between an operating system hang condition and an unusual processing delay. As a result, the user may experience uncertainty and/or frustration in attempting to determine whether an operating system hang condition has occurred. Inexperienced users, for example, may wait an inordinate amount of time for the computer system to respond to user input, unaware that the operating system is no longer functioning. Furthermore, in applications where the computer system is intended to continuously operate for long periods of time, such as Web servers, file servers, database servers or network servers, the failure to detect an operating system hang condition can become especially problematic. Because these computer systems typically perform tasks that are critical to an organization's business operations, system downtime caused by the failure to detect an operating system hang condition may be unacceptable.

Existing approaches for detecting operating system hang conditions have proven to be inadequate or unreliable in that they typically rely on user observation of system activity. For example, the user may attempt to determine whether an operating system hang condition has occurred by monitoring for hard drive activity, by testing for pointer and/or keyboard responsiveness or by actuating the "NumLock" key to determine if the key's associated LED changes state. These approaches, however, have limited reliability in that they rely upon the subjective judgment of the individual user which varies significantly depending upon the user's level of experience. Furthermore, these approaches require the presence of a human operator to perform physical observations of system activity and to perform a system reset in the event an operating system hang condition is detected. As a result, these approaches may be completely inadequate for detecting operating system hang conditions in server-based applications where the physical observation of system activity by a human operator may not be a viable or cost effective option.

Therefore, in light of the deficiencies of existing approaches, there is a need for a mechanism that detects and possibly corrects operating system hang conditions in a more reliable and cost effective manner.

SUMMARY OF THE INVENTION

The deficiencies of the prior art are overcome by the method, system and apparatus of the present invention. For example, as heretofore unrecognized, it would be beneficial to detect an operating system hang condition by setting a status flag to a first value, generating an operating system interrupt intended for an operating system interrupt handler within an operating system kernel that resets the status flag to a second value, executing the operating system interrupt handler if the operating system kernel is responding to the operating system interrupt and executing a system BIOS interrupt handler that measures a time interval in which the status flag is set to the first value without being reset to the second value. If the measured time interval exceeds a predetermined threshold, an operating system hang condition is presumed to have occurred and an appropriate procedure may be called that, for example, informs the user of an operating system malfunction, automatically performs a system reset, corrects the problem causing the operating system hang condition or performs combinations thereof.

In a first and preferred embodiment of the present invention, a timer is configured to set a status flag to a first value and generate an operating system interrupt in response to an overflow of the timer. The operating system interrupt is associated with a timer interrupt handler within an operating system kernel that functions to reset the status flag to a second value if the operating system kernel is responding to the operating system interrupt. A "watchdog" timer is also configured to periodically generate a system BIOS interrupt, where the system BIOS interrupt is associated with a watchdog timer handler. When the watchdog timer handler gains control of the processor, the watchdog timer handler increments a watchdog counter in response to the status flag having the first value and clears the watchdog counter in response to the status flag having the second value. If the watchdog counter exceeds a predetermined threshold, an operating system hang condition is presumed to have occurred and an appropriate procedure may be called that, for example, informs the user of an operating system malfunction, automatically performs a system reset, corrects the problem causing the operating system hang condition, or performs combinations thereof The technical advantages of the present invention include, but are not limited to, the following exemplary technical advantages. It should be understood that particular embodiments may not involve any, much less all, of the following exemplary technical advantages.

An important technical advantage of the present invention is that it better enables a user to detect an operating system hang condition by utilizing a more reliable detection mechanism.

Another important technical advantage of the present invention is that it provides a cost effective mechanism for detecting an operating system hang condition by eliminating the need for physical observation of system activity by a human operator.

Yet another important technical advantage of the present invention is the ability to reduce uncertainty and/or frustration of a user by ensuring that the user is informed of an operating system hang condition so that the user may take appropriate action.

Yet another important technical advantage of the present invention is the ability to reduce system downtime by providing a mechanism that can correct an operating system hang condition and/or automatically perform a system reset in response to detection of an operating system hang condition.

The above-described and other features of the present invention are explained in detail hereinafter with reference to the illustrative examples shown in the accompanying drawings. Those skilled in the art will appreciate that the described embodiments are provided for purposes of illustration and understanding and that numerous equivalent embodiments are contemplated herein.

BRIEF DESCRIPTION OF THE DRAWINGS

A more complete understanding of the method, system and apparatus of the present invention may be had by reference to the following detailed description when taken in conjunction with the accompanying drawings wherein.

DETAILED DESCRIPTION OF THE DRAWINGS

In the following description, for purposes of explanation and not limitation, specific details are set forth, such as particular circuits, logic modules (implemented in, for example, software, hardware, firmware, some combination thereof, etc.), techniques, etc. in order to provide a thorough understanding of the invention. However, it will be apparent to one of ordinary skill in the art that the present invention may be practiced in other embodiments that depart from these specific details. In other instances, detailed descriptions of well-known methods, devices, logical code (e.g., hardware, software, firmware, etc.), etc. are omitted so as not to obscure the description of the present invention with unnecessary detail.

Figure 1:
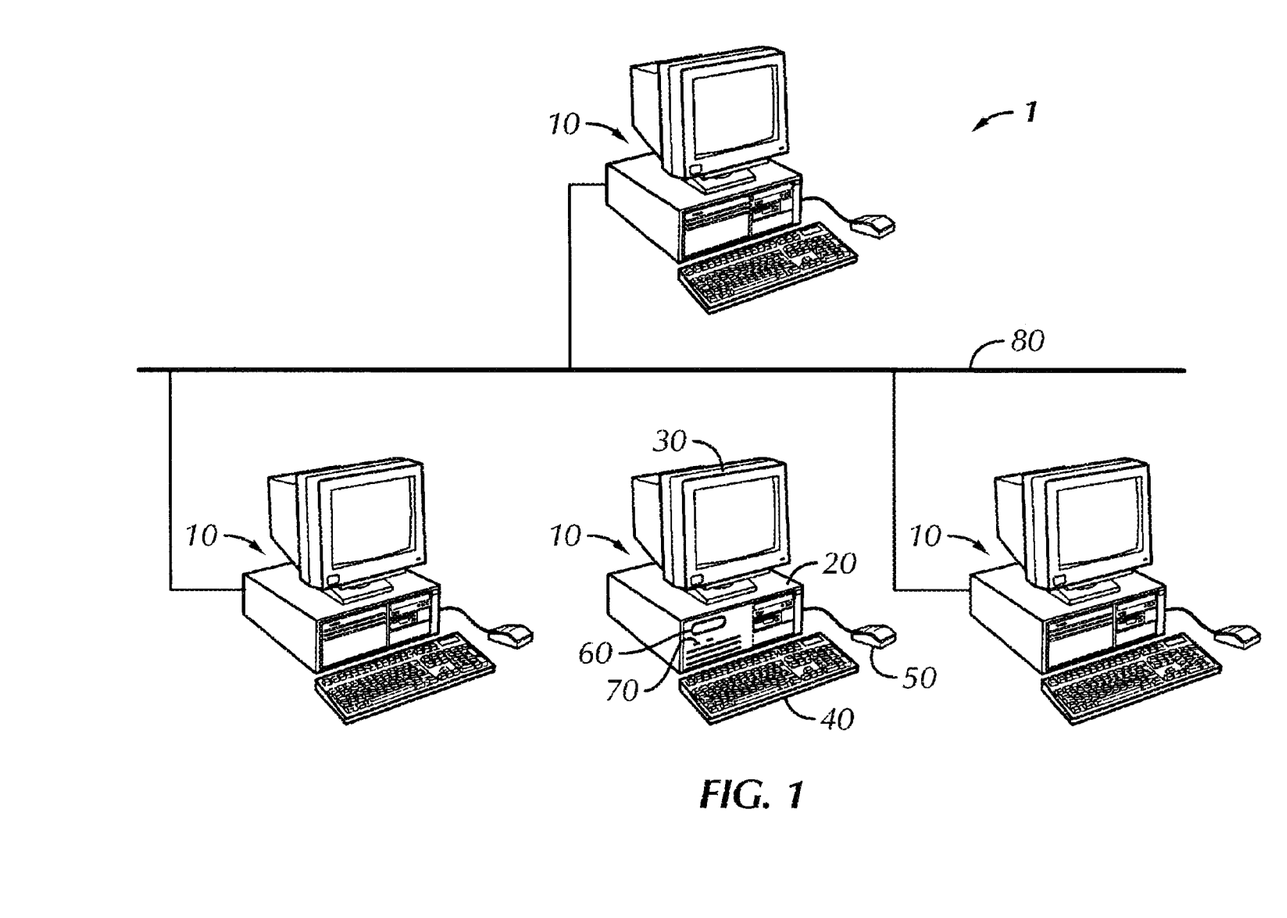
FIG. 1 illustrates an exemplary system in which the principles of the present invention may be advantageously practiced.

Preferred embodiment(s) of the present invention and its advantages are best understood by referring to FIGS. 1–4 of the drawings, like numerals being used for like and corresponding parts of the various drawings. Referring to FIG. 1, an exemplary system in which the principles of the present invention may be advantageously practiced is depicted generally at 1. This exemplary system includes a plurality of computers 10 that are configured to detect and possibly correct operating system hang conditions as described in further detail hereinbelow. Each of the computers 10 within the exemplary system includes a base unit 20 that houses one or more processors, hard drives, memory units, hardware controllers, etc. for executing system BIOS instructions, operating system instructions and software applications that are stored within each computer 10. Each base unit 20 may be further connected to a monitor 30, a keyboard 40, a pointer device 50 or other peripheral devices commonly connected to conventional computer systems.

In accordance with one aspect of the present invention, the base unit 20 includes a LCD display 60 on the external surface of the base unit 20 for displaying visual messages to the user, such as messages informing the user of an operating system malfunction and instructing the user to perform a system reset. The base unit 20 may also include an internal or external speaker 70 for communicating user notifications in the form of audible beeps or synthesized speech. It should be noted that the computers 10 within the exemplary system may include network interfaces (not shown) for communicating with other computers 10 via a communications network 80, such as a Local Area Network (LAN), Wide Area Network (WAN) and the Internet. In this context, each computer 10 within the exemplary system may be configured as a stand-alone personal computer, a host computer or a server.

Figure 2:
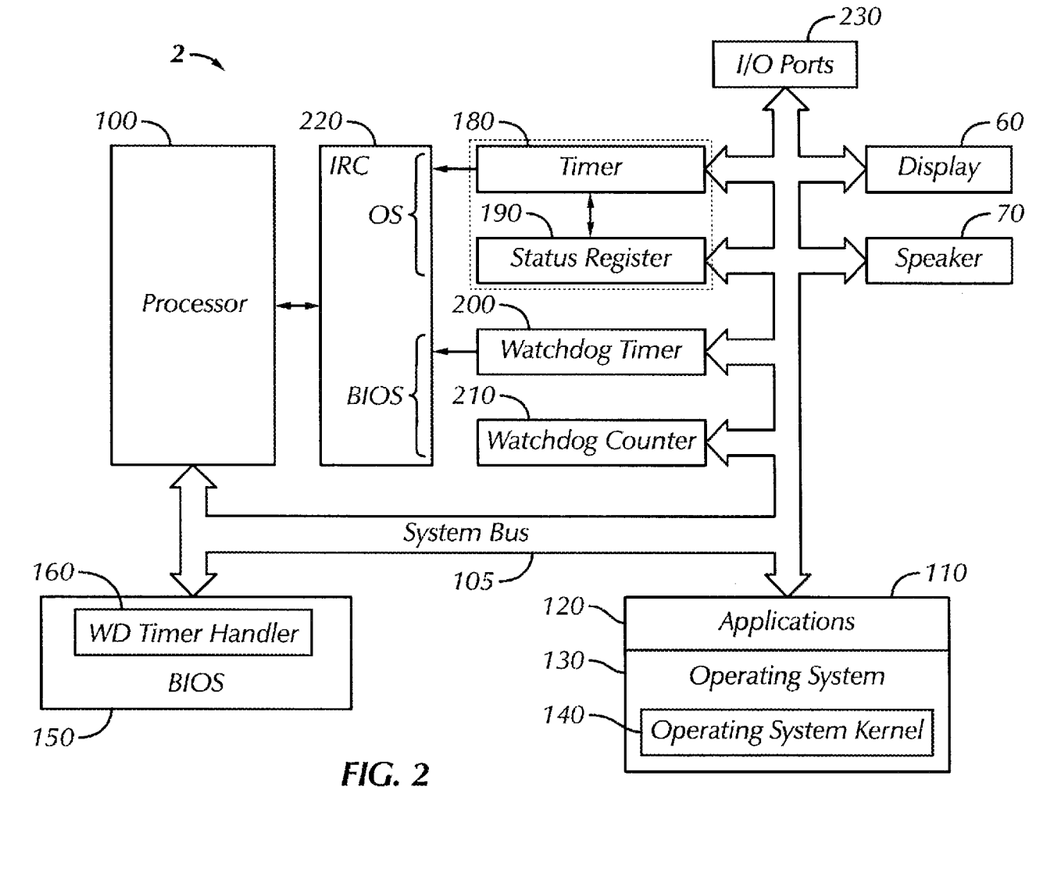
FIG. 2 illustrates a schematic diagram of an exemplary computer system incorporating the principles of the present invention.

Referring to FIG. 2, a schematic diagram of an exemplary computer system incorporating the principles of the present invention is illustrated generally at 2. As illustrated, the exemplary computer system includes a processor 100 that is coupled to the system BIOS 150 and a system memory unit 110 via a system bus 105. The system BIOS 150 stores instructions that enable the computer's operating system 130 to interface with attached devices, such as a hard drive, video adapter, keyboard 40, pointer device 50 and printer. The system BIOS 150 also includes interrupt handlers for processing certain hardware or software interrupts that may occur independent of and transparent to the operating system 130. The system memory unit 110, on the other hand, stores application software 120, the operating system 130 and the operating system kernel 140. The operating system kernel 140 is responsible for most of the core functionalities of the operating system 130 and includes interrupt handlers for processing service requests from devices and processes. The operating system kernel 140 may also include instructions within the interrupt handlers that perform system BIOS function calls in a manner commonly known in the art.

In accordance with the principles of the present invention, the exemplary computer system of FIG. 2 detects operating system hang conditions by exploiting the fact that when an operating system hang condition occurs, the operating system kernel 140 generally fails to respond to operating system interrupts. For example, the operating system hang condition may cause the operating system 130 to enter a state that disables or otherwise prevents the operating system kernel 140 from processing operating system interrupts. Alternatively, a defective device or process may continuously generate operating system interrupts that prevent the operating system kernel 140 from processing operating system interrupts from other devices or processes. It is this inability of the operating system kernel 140 to process operating system interrupts that may cause the user to subjectively perceive a decrease in system activity and/or system responsiveness. By monitoring the operating system kernel's ability to process operating system interrupts in accordance with the principles of the present invention, the occurrence of an operating system hang condition may be detected without requiring subjective observation of system activity by a human operator.

To perform this monitoring process, the exemplary computer system of FIG. 2 includes a timer 180, a status register 190, a watchdog timer 200 and a watchdog counter 210. The timer 180 may be initially enabled and/or configured by system BIOS 150 to periodically overflow in predetermined time intervals (e.g., every 2.5 seconds). Each overflow of the timer 180 causes the timer 180 to set a status flag stored within the status register 190. Preferably, the timer 180 is coupled to the status register 190 in a manner that enables the status flag to be set independently of the operating system 130. For example, the timer 180 and the status register 190 may be configured as a functional unit where the timer 180 can set the status flag via an associated hardware operation. Each overflow of the timer 180 also causes the timer 180 to generate an operating system interrupt that may be coupled to the processor 100 via an interrupt controller 220. This operating system interrupt is associated with a timer interrupt handler within the operating system kernel 140 that includes instructions for either directly resetting the status flag or indirectly resetting the status flag via an associated system BIOS function call.

If the operating system kernel 140 is processing operating system interrupts (indicating that an operating system hang condition has not occurred), the status flag will remain in a reset state, except for the relatively short periods of time between the setting of the status flag by the timer 180 and the resetting of the status flag by the timer interrupt handler. If an operating system hang condition has occurred, however, the operating system kernel 140 will not respond to operating system interrupts and therefore, will not reset the status flag in response to the operating system interrupt generated by the timer 180. Therefore, if the status flag remains in a set state for a predetermined amount of time (e.g., between ten and fifteen seconds), an operating system hang condition may be presumed to have occurred.

The watchdog timer 200 and the watchdog counter 210 of FIG. 2 may be used to monitor the set/reset state of the status flag and measure the amount of time the status flag remains in a set state. The watchdog timer 200 may be configured by the system BIOS 150 during system power-up to periodically generate a system BIOS interrupt that may be coupled to the processor 100 via the interrupt controller 220. The system BIOS interrupt generated by the watchdog timer 200 causes the processor 100 to execute watchdog timer handler 160 within the system BIOS 150. It should be noted that the system BIOS interrupt generated by the watchdog timer 200 is transparent to the operating system 130, and therefore, the watchdog timer handler 160 can gain control of the processor 100 even though an operating system hang condition has occurred and even though the operating system kernel 140 is no longer responding to operating system interrupts. It should also be noted that the period in which the watchdog timer 200 generates a system BIOS interrupt is preferably different than the period in which the timer 180 generates an operating system interrupt to in order to avoid potential problems associated with the timer 180 and watchdog timer 200 being in synchronization.

When the watchdog timer handler 160 gains control of the processor 100, the watchdog timer handler 160 checks the set/reset state of the status flag stored within the status register 190. If the status flag is in a set state (indicating that the operating system kernel 140 is not responding to operating system interrupts), the watchdog timer handler 160 increments the value of the watchdog counter 210. Conversely, if the status flag is in a reset state (indicating that the operating system kernel 140 is responding to operating system interrupts), the watchdog timer handler 160 resets or clears the watchdog counter 210 to a value of zero, regardless of the current value of the watchdog counter 210. If the value within the watchdog counter 210 exceeds a predetermined threshold (indicating that the status flag has been in a set state for a predetermined number of watchdog timer events), an operating system hang condition is presumed to have occurred.

It should be noted that a single instance of the status flag being in a set state may be an unreliable indicator of an operating system hang condition, because this situation may merely indicate that insufficient time has elapsed for the operating system kernel 140 to process the operating system interrupt generated by the timer 180. Accordingly, the predetermined threshold at which an operating system hang condition is presumed to have occurred is preferably greater than one. One exemplary predetermined threshold that produces good results is a value of five. This predetermined threshold may be a preset value that is coded within the watchdog timer handler 160. Alternatively, the predetermined threshold may be selectively adjusted by the user via a system BIOS Setup operation. One advantage of this alternative approach is that it enables the user to select an appropriate predetermined threshold based on the user's experiences and the particular configuration and/or operation of the user's computer system.

Once the watchdog timer handler 160 determines that an operating system hang condition has occurred, various procedures may be initiated by the watchdog timer handler 160 to either inform the user of an operating system malfunction or automatically correct or resolve the problem. These procedures take into account that the operating system 130 is presumed to have experienced an operating system hang condition, and therefore, the code that implements these procedures may be limited to the code within the system BIOS 150 (unless the code is specially designed to execute independently of the operating system 130). In one exemplary procedure, the watchdog timer handler 160 initiates system BIOS code that displays a message on the LCD display 60 that informs the user of an operating system malfunction and/or instructs the user to perform a system reset operation. Another option initiates system BIOS code that outputs similar user notifications in the form of an audible beep or synthesized speech via the internal or external speaker 70. These options may be especially advantageous for inexperienced users who may be unable to distinguish between an operating system hang condition and an unusual processing delay. As a result, these options inform the user of the operating system hang condition and thereby enable the user to take appropriate action.

Another option that the watchdog timer handler 160 may initiate is to automatically perform a system reset by, for example, initiating a software PCI reset operation. This option may be advantageous in server-based applications where the servers are intended to continuously operate for long periods of time and where the system downtime caused by the failure to detect an operating system hang condition may be unacceptable. Still another option the watchdog timer handler 160 may initiate is to correct the operating system hang condition by checking for common causes of operating system hang conditions. For example, the system BIOS 150 may poll devices connected to the computer system to determine whether any devices are continuously generating an operating system interrupt. If so, the system BIOS 150 may power down or otherwise disable these devices in order to clear the operating system interrupt and thereby enable the operating system kernel 140 to process operating system interrupts from other devices or processes. The system BIOS 150 may also communicate a message via the LCD display 60 or speaker 70 that informs the user that a particular device or process has mailfunctioned and that the computer system has disabled the particular device or process.

It should be noted that when the exemplary computer system of FIG. 2 is being monitored by a hardware or software debugger, the debugger may generate an operational state that simulates an operating system hang condition. For example, many debuggers disable operating system interrupts or perform a trapping or single-stepping operation that prevents the operating system kernel 140 from processing operating system interrupts for significant periods of time. In order to avoid erroneously detecting an operating system hang condition in these situations, the watchdog timer handler 160 may include instructions that determine whether a debugger is connected to one of the I/O Ports 230 and/or whether the processor 100 is in a trapping or single-step mode. For example, the presence of a serial debugger may be detected by checking the serial port for a non-OFFh (e.g., active) value. Furthermore, many processors include status bits to indicate the current operational mode of the processor that the watchdog timer handler 160 may use to determine whether the processor 100 is in a single-step mode. If the watchdog timer handler 160 detects a hardware or software debugger, the watchdog timer handler 160 may disable the timer 180 and/or the watchdog timer 200 from generating further interrupts and thereby avoid potentially interfering with the debugging operations.

Figure 3:
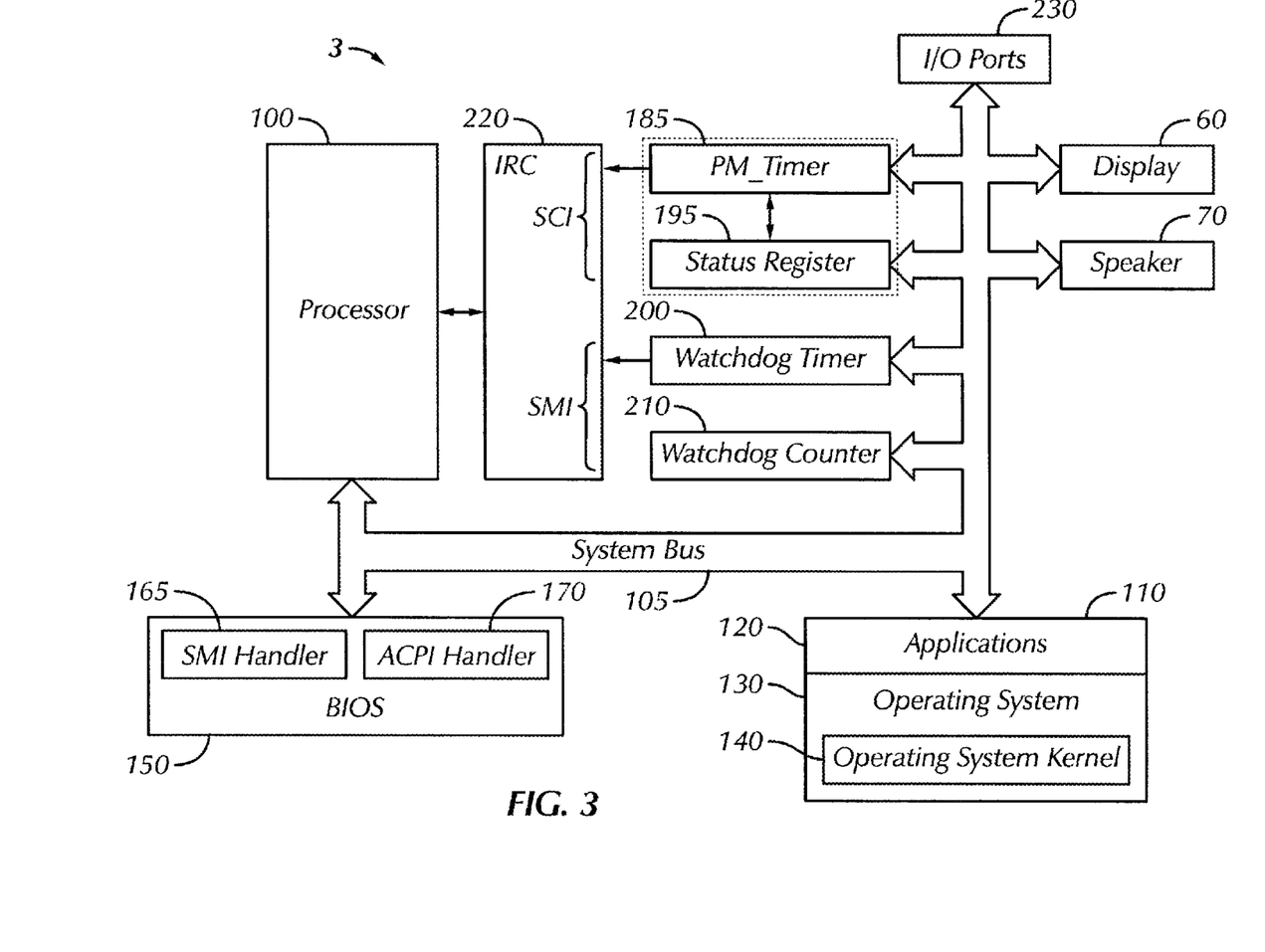
FIG. 3 illustrates a schematic diagram of an exemplary computer system in accordance to with one embodiment of the present invention.

Referring to FIG. 3, a schematic diagram of an exemplary computer system in accordance with one embodiment of the present invention is depicted generally at 3. This embodiment of the present invention detects operating system hang conditions in a manner similar to the embodiment of FIG. 2, but utilizes many of the features commonly employed in Advanced Configuration and Power Interface (ACPI) architectures and allows the principles of the present invention to be easily incorporated within existing systems. As illustrated, the exemplary computer system of FIG. 3 includes a Power Management Timer (PM Timer) 185 and an associated PM Timer status register 195. The PM Timer 185 is configured by a ACPI handler 170 during operating system boot procedures to generate a System Control Interrupt (SCI) to the operating system kernel 140 and set a TMR_STS bit stored within the status register 195 in response to each overflow of the PM Timer 185. The SCI generated by the PM Timer 185 is associated with a SCI interrupt handler within the operating system kernel 140 that determines which device or process generated the SCI and calls the ACPI BIOS handler 170 to service the device or process.

In accordance with this embodiment of the present invention, the ACPI BIOS handler 170 includes one or more instructions which when executed by the processor 100 cause the processor 100 to reset the TMR_STS bit. Accordingly, by monitoring the set/reset status of the TMR_STS bit the exemplary computer system of FIG. 3 can detect the occurrence of an operating system hang condition. For example, assuming an operating system hang condition has not occurred, the operating system kernel 140 will process the SCI generated by the PM Timer 185 and call the ACPI BIOS handler 170 that operates to reset the TMR_STS bit. As a result, the TMR_STS bit will remain in a reset state, except for the relatively short periods of time between the setting of the TMR_STS bit by the PM Timer 185 and the resetting of the TMR_STS bit by the ACPI BIOS handler 170. If an operating system hang condition has occurred, however, the operating system kernel 140 will not respond to the SCI generated by the PM Timer 185 and therefore, the TMR_STS bit will remain in a set state. If the TMR_STS bit remains in a set state for a predetermined amount of time (e.g., between ten and fifteen seconds), an operating system hang condition may be presumed to have occurred.

The watchdog timer 200 and the watchdog counter 210 of FIG. 3 may used to monitor the set/reset state of the TMR_STS bit and measure the amount of time that the TMR_STS bit remains in a set state. The watchdog timer 200 may be configured by the SMI handler 165 in response to a software SMI generated by the operating system 130 during operating system boot procedures to periodically generate an SMI independent of and transparent to the operating system 130. The SMI generated by the watchdog timer 200 causes the processor 100 to a execute the SMI handler 165. When the SMI handler 165 gains control of the processor 100, the SMI handler 165 checks the set/reset state of the TMR_STS bit stored within the status register 195.

If the TMR_STS bit is in a set state (indicating that the operating system kernel 140 is not responding to the SCI generated by the PM Timer 195), the SMI handler 165 increments the value of the watchdog counter 210. Conversely, if the TMR_STS bit is in a reset state (indicating that the operating system kernel 140 is responding to the SCI generated by the PM Timer 195), the SMI handler 165 resets or clears the watchdog counter 210 to a value of zero, regardless of the current value of the watchdog counter 210. If the value within the watchdog counter 210 exceeds a predetermined threshold (indicating that the TMR_STS bit has been in a set state for a predetermined number of watchdog timer events), an operating system hang condition is presumed to have occurred, and the SMI handler 165 may initiate one or more of the options performed in response to detection of an operating system hang condition as discussed above with respect to the embodiment of FIG. 2.

One problem that may be experienced with the embodiment of FIG. 3 is when the operating system 130 puts the computer system in a "sleep" or power-down mode in accordance with ACPI procedures. For example, the operating system 130 may cause the computer system to enter a sleep mode if the computer system has been idle for a predetermined amount of time. If the watchdog timer 200 continues to periodically generate an SMI, the watchdog timer 200 may cause the exemplary computer system to "wake" or power-up, thereby defeating the purpose of the power management system. In order to resolve this problem, the exemplary computer system of FIG. 3 takes advantage of the fact that the operating system 130 communicates the "sleep" and "wake" commands to the ACPI BIOS handler 170. In accordance with this embodiment of the present invention, when the ACPI BIOS handler 170 receives a sleep command from the operating system 130, the ACPI BIOS handler 170 also disables the watchdog timer 200. Conversely, when the ACPI BIOS handler 170 receives a command to wake the system, the ACPI BIOS handler 170 re-enables the watchdog timer 200. As a result, the exemplary computer system of FIG. 3 may be configured to only perform operating system hang detection when the exemplary computer system is in a wake or active mode.

Figure 4:
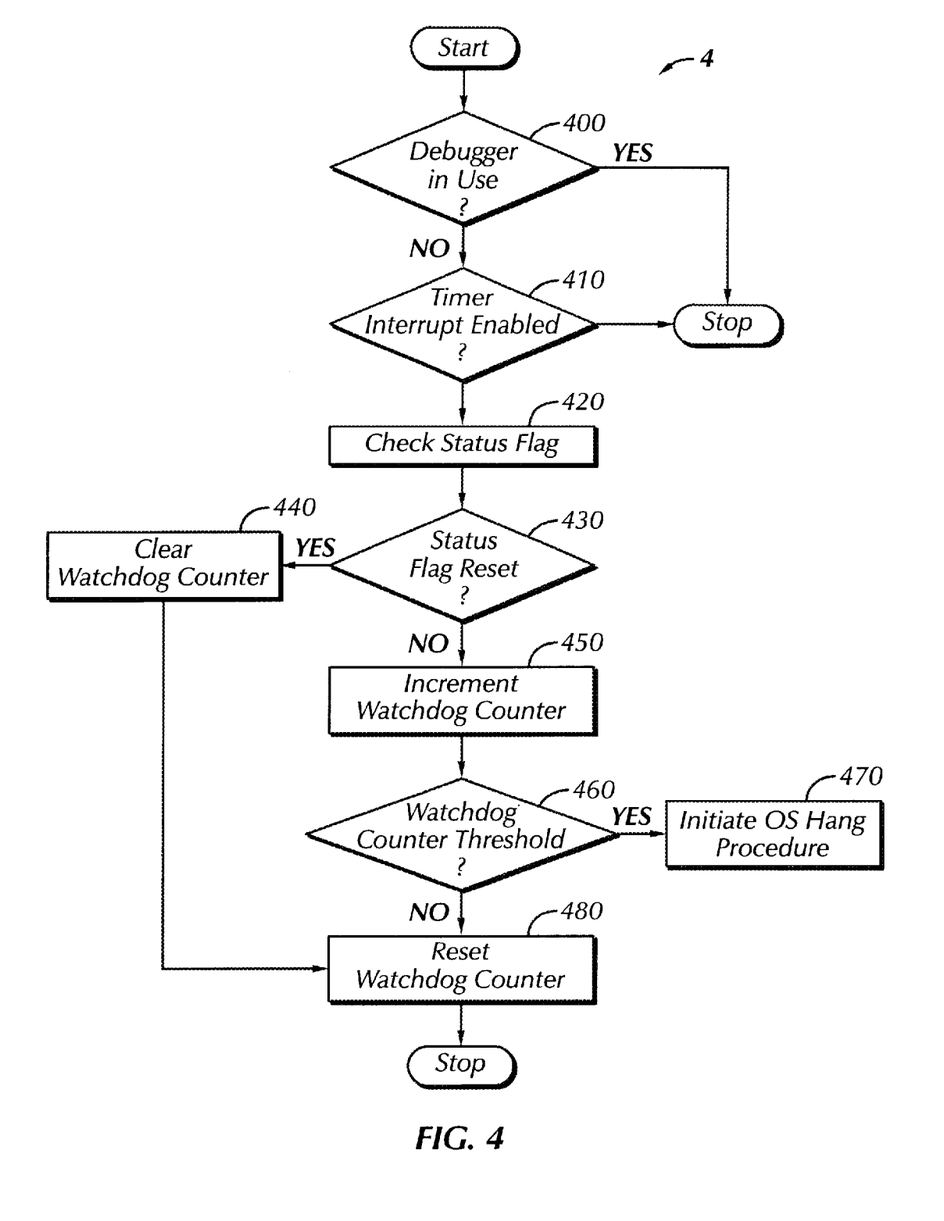
FIG. 4 illustrates an exemplary method in flow chart form in which the principles of the present invention may be advantageously practiced.

Referring to FIG. 4, an exemplary method in flow chart form in which the principles of the present invention may be advantageously practiced is illustrated generally at 4. Although the exemplary method generally illustrates the operation of the watchdog timer handler 160 of FIG. 2 in response to the system BIOS interrupt generated by the watchdog timer 200, the exemplary method may also be used in conjunction with the SMI handler 160 of FIG. 3. At step 400, the watchdog timer handler 160 determines whether a hardware or software debugger is currently monitoring the exemplary computer system, where this step 400 may use one or a combination of the above-mentioned approaches for detecting whether a debugger is in use. If a debugger is not detected, the watchdog timer handler 160 may determine whether the operating system interrupt associated with the timer 180 is enabled at step 410. This step may be especially advantageous when used in conjunction with the embodiment of FIG. 3 in that the operating system 130 may disable the PM Timer 185 from generating an SCI if the user decides to disable power management functionalities. If the PM Timer 185 is not running or cannot generate an operating system interrupt, erroneous detection of an operating system hang condition may occur.

If the operating system interrupt associated with the timer 180 is enabled, the watchdog timer handler 160 checks the set/reset status of status flag stored in the status register 190 at step 420. If the status flag is determined to be in a reset state at step 430 (indicating that the operating system kernel 140 is processing operating system interrupts), the watchdog counter 210 is reset to zero at step 440. The watchdog timer 200 is then reset so that the watchdog timer 200 can generate another system BIOS interrupt.

Referring back to step 430, if the status flag is not in a reset state (indicating that the operating system kernel 140 is not processing operating system interrupts), the watchdog counter 210 is incremented at step 450. If the value of the watchdog counter 210 is less than a predetermined threshold (e.g., a value of five) at step 460, the watchdog timer 200 is reset at step 480 so that the watchdog timer 200 can generate another system BIOS interrupt. If the watchdog counter 210 is greater than the predetermined threshold (indicating that the status flag has been in a set state for a predetermined number of watchdog timer events), the watchdog timer handler 160 initiates an operating system hang procedure at step 470, which may include, for example, any one or a combination of the options performed in response to detection of an operating system hang condition as discussed above with respect to the embodiment of FIG. 2.

Although preferred embodiment(s) of the method, system and apparatus of the present invention have been illustrated in the accompanying Drawings and described in the foregoing Detailed Description, it will be understood that the present invention is not limited to the embodiment(s) disclosed, but is capable of numerous rearrangements, modifications, and substitutions without departing from the spirit and scope of the present invention as set forth and defined by the following claims.

What is claimed is:

1. A method for detecting an operating system hang condition within a computer system, the computer system operated in accordance with an operating system having an operating system kernel, the method comprising the steps of:
   setting a status flag to a first value;
   generating an operating system interrupt intended for an operating system interrupt handler within the operating system kernel, the operating system interrupt handler configured to reset the status flag to a second value;
   executing the operating system interrupt handler if the operating system kernel is responding to the generated operating system interrupt;
   periodically generating a system BIOS interrupt which is independent of and transparent to the operating system;
   executing a system BIOS interrupt handler in response to the generated system BIOS interrupt, the system BIOS interrupt handler configured to perform a step of measuring a time interval in which the status flag is set to the first value without being reset to the second value;
   comparing the measured time interval to a threshold time interval; and
   determining that the operating system hang condition has occurred in response to the measured time interval exceeding the threshold time interval.

2. The method of claim 1, wherein the step of measuring performed by the system BIOS interrupt handler comprises the steps of:
   determining whether the status flag has the first or the second value;
   incrementing a counter value in response to the status flag having the first value;
   setting the counter value to zero in response to the status flag having the second value; and
   wherein the counter value represents a number of consecutive time periods in which the status flag is set to the first value without being reset to the second value.

3. The method of claim 1, wherein the step of comparing comprises comparing the measured time interval to a user configurable threshold time interval, the user configurable threshold time interval configured via a system BIOS setup operation.

4. The method of claim 1, further comprising the step of disabling the step of periodically generating the system BIOS interrupt in response to the computer system entering a sleep mode.

5. The method of claim 4, further comprising the step of re-enabling the step of periodically generating the system BIOS interrupt in response to the computer system transitioning from the sleep mode.

6. The method of claim 1, further comprising the step of disabling the step of periodically generating the system BIOS interrupt in response to detection of a debugger.

7. The method of claim 1, further comprising the step of displaying a message on a display device in response to the determination that the operating system hang condition has occurred.

8. The method of claim 1, further comprising the step of outputting a user notification to a speaker in response to the determination that the operating system hang condition has occurred.

9. The method of claim 1, further comprising the step of automatically performing a system reset operation in response to the determination that the operating system hang condition has occurred.

10. The method of claim 1, wherein the operating system interrupt comprises a System Control Interrupt (SCI), and the system BIOS interrupt comprises a System Management Interrupt (SMI).

11. A system for detecting an operating system hang condition within a computer system, the computer system operated in accordance with an operating system having an operating system kernel, the system comprising:
   a processor;
   a status register coupled to the processor, the status register for storing a status flag;
   a timer coupled to the status register and the processor, the timer configured to set the status flag to a first value and generate an operating system interrupt to an interrupt handler within the operating system kernel in response to an overflow of the timer;
   a watchdog timer coupled to the processor, the watchdog timer configured to periodically generate a system BIOS interrupt to a watchdog timer handler within a system BIOS of the computer system, the system BIOS interrupt generated independent of and transparent to the operating system;
   a watchdog counter, coupled to the processor, for storing a counter value;
   a first memory unit coupled to the processor, the first memory unit for storing the interrupt handler instructions which when executed by the processor cause the processor to operate so as to:
 reset the status flag to a second value if the operating system kernel is responding to the operating system interrupt; and
 a second memory unit coupled to the processor, the second memory unit for storing the watchdog timer handler instructions which when executed by the processor cause the processor to operate so as to:
  read the value of the status flag;
  increment the counter value stored within the watchdog counter in response to the status flag having the first value;
  clear the counter value stored within the watchdog counter in response to the status flag having the second value; and
  determine that the operating system hang condition has occurred in response to the counter value exceeding a threshold value.

12. The system of claim 11, wherein the timer comprises a Power Management Timer.

13. The system of claim 12, wherein the status register comprises a Power Management Timer status register, and the status flag comprises a Power Management Timer status bit (TMR_STS) stored within the Power Management Timer status register.

14. The system of claim 12, wherein the operating system interrupt comprises a System Control Interrupt (SCI), and the system BIOS interrupt comprises a System Management Interrupt (SMI).

15. The system of claim 11, wherein the second memory unit further includes instructions which when executed by the processor cause the processor to operate so as to:
 disable the watchdog timer in response to the computer system entering a sleep mode; and
 re-enable the watchdog timer in response to the computer system transitioning from the sleep mode.

16. The system of claim 11, wherein the second memory unit further includes instructions which when executed by the processor cause the processor to operate so as to:
 display a message on a display device in response to the determination that the operating system hang condition has occurred.

17. The system of claim 11, wherein the second memory unit further includes instructions which when executed by the processor cause the processor to operate so as to:
 output a user notification via a speaker in response to the determination that the operating system hang condition has occurred.

18. The system of claim 11, wherein the second memory unit further includes instructions which when executed by the processor cause the processor to operate so as to:
 automatically perform a system reset operation in response to the determination that the operating system hang condition has occurred.

19. The system of claim 11, wherein the computer system comprises a server.

20. An apparatus for detecting the occurrence of an operating system hang condition within a computer system, the apparatus comprising:
 a memory device for storing instructions which when executed by a processor cause the processor to operate so as to:
  periodically read a status flag that is set to a first value in response to an overflow of a timer and reset to a second value in response to execution of an operating system interrupt handler, the execution of the operating system interrupt handler being dependent upon whether an operating system kernel of the computer system is responding to operating system interrupts;
  increment a counter in response to the status flag having the first value;
  clear the counter in response to the status flag having the second value; and
  determine that the operating system hang condition has occurred in response to the counter exceeding a threshold value.

21. The apparatus of claim 20, wherein the memory device further includes instructions which when executed by the processor cause the processor to operate so as to:
 disable a watchdog timer that initiates execution of the instructions stored within the memory device in response to the computer system entering a sleep mode; and
 re-enable the watchdog timer in response to the computer system transitioning from the sleep mode.

22. The apparatus of claim 20, wherein the memory device further includes instructions which when executed by the processor cause the processor to operate so as to:
 display a message on a display device in response to the determination that the operating system hang condition has occurred.

23. The apparatus of claim 20, wherein the memory device further includes instructions which when executed by the processor cause the processor to operate so as to:
 output a user notification via a speaker in response to the determination that the operating system hang condition has occurred.

24. The apparatus of claim 20, wherein the memory device further includes instructions which when executed by the processor cause the processor to operate so as to:
 automatically perform a system reset operation in response to the determination that the operating system hang condition has occurred.

25. The apparatus of claim 20, wherein the instructions comprise system BIOS instructions.

* * * * *